United States Patent Office 3,321,267
Patented May 23, 1967

3,321,267
TREATMENT OF POLYOLEFIN - NITROGENOUS RESIN FIBER WITH METHYL AZIRIDINYL PHOSPHOXIDES
Alberto Bonvicini and Ennio Ildos, Terni, Italy, assignors to Montecatini Edison S.p.A., Milan, Italy, a corporation of Italy
No Drawing. Filed May 20, 1963, Ser. No. 281,830
Claims priority, application Italy, May 24, 1962, 10,341/62
14 Claims. (Cl. 8—100)

This invention relates to a process for improving the tinctorial characteristics of articles of olefin polymers and, more particularly, of fibers obtained by spinning a mixture of an olefin polymer consisting essentially of isotactic macromolecules and prepared by low pressure polymerization with the aid of stereospecific catalysts, and a basic nitrogen polymer. The invention also relates to the improved products obtained by the method of this invention.

Various processes have been described in which polyolefin fibers are rendered dye receptive, e.g., by extruding a mixture of a polyolefin with a basic nitrogen polymer and then subjecting the resulting fibers to the action of mono- and diepoxy compounds, halogens, alkylene oxides, diisocyanates, formaldehyde, trimethylol-propane diallyl-ether, cross-linking monomers, and the like.

The present invention provides a process by which the fibers of olefin polymers are rendered more receptive to dyes.

According to the present invention, it has surprisingly been found that by treating textile fibers of polyolefins prepared with stereospecific catalysts, and particularly, polypropylene consisting essentially of isotactic macromolecules, modified by the addition of a basic nitrogen polymer which acts as a tinctorial modifier, with a phosphorus compound of the general formula

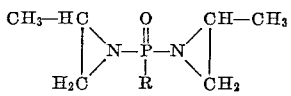

in which R is an alkyl radical having from 1 to 30 carbon atoms, such as methyl, ethyl, and the like, an aryl radical, an imino radical, or the like, the tinctorial characteristics of these fibers are markedly improved.

The treatment of the present invention is particularly suitable for fibers made from a mixture of polypropylene and a tinctorial modifier. The tinctorial modifier is a basic nitrogen compound of polymeric character, e.g., polyimines prepared with stereo-specific catalysts, basic polycondensates of epichlorohydrin with amines, dihalogen derivatives of bis-secondary diamines, reaction products of diglycidylamines with amines and/or diamines, etc.

According to the present invention the treatment of the fibers is advantageously carried out by immersing the fibers in an aqueous or inorganic solution containing one of the phosphorus compounds of the present invention, at a temperature of from about room temperature to 150° C., and preferably from about room temperature to 80° C., with the concentration of the phosphorus compound in the solvent being from about 0.1 to 25% by weight, and more preferably from about 1 to 10% by weight, for a time of from 2–3 seconds to two to three hours.

The treatment of the fibers can be carried out in the presence of substances exerting a swelling action on the fibers.

The application of the compounds of the present invention may be carried out either before or after stretching of the fibers.

Treatment of the fibers which contain polymeric nitrogen compounds which serve as tinctorial modifiers increases the receptivity of the fibers to acid dyes, metallized dyes, chromium dyes, vat dyes and disperse dyes. Moreover, the color fastness is also substantially improved.

The treatment of our invention is generally applied to the fibers consisting essentially of a mixture of a polyolefin prepared with stereospecific catalysts, more particularly isotactic polypropylene, and a basic nitrogen polymer such as crystalline polyvinylpyridines, basic polycondensates of epichlorohydrin with aliphatic amines, polycondensates of dihalogen derivatives with damines, polyimines, and the like.

The spinning of the fiber-forming mixture can conveniently be carried out in the presence of a small amount (preferably 0.1 to 5% by weight of the total mixture) of a solid dispersant which facilitates the homogenous dispersion of the basic nitrogen compound in the polymer mass. This dispersant is desirably any of the following: cetyl alcohol, stearyl alcohol, stearic acid, terephthalic acid, benzoin, furoin, vinyl stearate, mono-, di or tri-stearic esters of glycerol, monoethanolamine stearate, N-diethanol lauramide, $C_6$–$C_{30}$ aliphatic amines, condensates of ethylene oxide with alcohols or amines or phenols, polystearamide, polyacrylic acid, polystyrene, styrene copolymers, terpene polymers, etc.

The fibers obtained by extrusion of the foregoing mixtures may be in the form of mono- or plurifilaments and can be used to prepare continuous or staple yarns or for preparing bulk yarns or bulk staple fibers.

The spinning of the compositions of the present invention is preferably carried out by extrusion through spinnerets in which the holes have a length/diameter ratio greater than 1.

The stretching process is carried out with stretching ratios of from about 1:2 to 1:10, at a temperature of from about 80 to 150° C., in stretching devices heated with hot air, steam, or a similar fluid, or on a heating plate.

In the practical realization of the present invention, variations can of course be made without departing from the spirit and scope of our invention.

The following examples will further illustrate our invention. All parts are by weight unless otherwise stated. In the examples, $[\eta_{sp}]$ indicates the specific viscosity of the condensate determined on a 5% benzene solution of the condensate at 25° C. in a viscosimeter of the 100 Fenske type, while M.P. indicates the melting point.

Example 1

A mixture is prepared at room temperature in a Henschel mixer from:

| | Kg. |
|---|---|
| Polypropylene | 9.500 |
| Octadecylamine/epichlorohydrin/piperazine (0.3/1.3/1) polycondensate [$\eta_{sp}$]=0.31; M.P.=62° C. | 0.500 |

The characteristics of the polypropylene used are:

| | |
|---|---|
| [$\eta$] Intrinisic Viscosity as determined in tetrahydronaphthalene at 135° C. | 1.58 |
| Ash content, percent | 0.015 |
| Residue after heptane extraction, percent | 95.6 |

The mixture is granulated and is then extruded in a melt spinning device under the following conditions:

| | |
|---|---|
| Screw temperature, ° C. | 205 |
| Spinning head temperature, ° C. | 240 |
| Spinneret temperature, ° C. | 245 |

(Spinneret with 60 holes having a diameter of 0.8 mm. and a length of 16 mm.)

| | |
|---|---|
| Max. pressure kg./cm.² | 55 |
| Winding speed m./min | 380 |

The fiber is stretched in a steam-heated device at a temperature of 130° C., with a stretching ratio of 1 to 5.3.

It is then subjected to a stabilization treatment under conditions of free shrinking, at 105° C., for 60 minutes.

The characteristics of the stretched, stabilized fiber are as follows:

Tenacity, g./den. _____ 5.25
Elongation, percent _____ 23.8

The staple fiber obtained is immersed for 30 minutes at 25° C. into a 1% aqueous dispersion of phenyl-bis[1(2-methyl)aziridinyl]phosphoxide

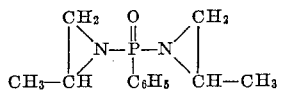

containing 0.25% of condensate of ethylene oxide with octylphenol having a molecular weight of about 450, with a fiber/bath ratio of 1:40. After heating to 120° C. for 20 minutes, the staple is washed with water and dried.

The treated staple was then dyed with the following dyes:

Alizarine yellow 2G (C.I. 14025) (C.I. yellow 1) (acid dye)
Wool red B (C.I. 27200) (C.I. acid red 115) (acid dye)
Alizarine red S (C.I. 58005) (C.I. mordant red 3) (acid dye)
Alizarine blue SE (C.I. 63000) (C.I. acid blue 43) (acid dye)
Acid black JVS (C.I. 20470) (C.I. acid black 1) (acid dye)
Setacyl brilliant blue E.G. (C.I. 61505) (C.I. disperse blue 3) (disperse dye)

The dyeing was carried out for 1 hour and a half at the boiling temperature, in baths containing 2.5 weight percent of dye based on the weight of the fiber, with a fiber/bath ratio of 1:40.

The dyeing with acid or metallized dyes was carried out in the presence of 3% of ammonium acetate (by weight of the fiber) and of 1% of a surface active agent consisting of the condensation product of ethylene oxide with octylphenol.

Thirty minutes after the commencement of boiling, 0.2 weight percent of glacial acetic acid (by weight of the fiber) was added in order to improve the bath exhaustion.

The dyeing with disperse dyes was carried out in the presence of 2 weight percent (by weight of the fiber) of the same surface-active compound.

After dyeing, the fibers were rinsed with running water. In each instance the fibers were intensely dyed with either acid, metallized, or disperse dyes.

The color fastness to light, washing and rubbing was completely satisfactory.

*Example 2*

A mixture is prepared at room temperature in a Henschel mixer from:

| | Kg. |
|---|---|
| Polypropylene | 9.500 |
| Poly-2-vinylpyridine | 0.500 |

The characteristics of the polypropylene used are as follows:

$[\eta]$ _____ 1.58
Ash content, percent _____ 0.015
Residue after heptane extraction, percent _____ 95.6

The poly-2-vinylpyridine exhibits the following characteristics:

$[\eta]$ _____ 0.35
Melting point, ° C. _____ 189

The mixture is granulated and then extruded in a melt spinning device under the following conditions:

Screw temperature, ° C. _____ 205
Spinning head temperature, ° C. _____ 240
Spinneret temperature, ° C. _____ 245

(Spinneret type with 60 holes having a diameter of 0.8 mm. and a length of 16 mm.)

Max. pressure, kg./cm.² _____ 55
Winding speed, m./minute _____ 380

The fiber is stretched in a steam-heated device at a temperature of 130° C. with a stretching ratio of 1 to 5.3.

It is then subjected to a dimensional stabilization treatment, under conditions of free shrinking, at 105° C., for 60 minutes.

The characteristics of the stretched, stabilized fibers are as follows:

Tenacity, g./den. _____ 5.1
Elongation, percent _____ 25.0

The fiber is then crimped and cut into a staple having a length of 9 cm.

The staple obtained is immersed for 30 minutes at 25° C. in a 1% aqueous solution of tris [1(2-methyl)aziridinyl] phosphoxide

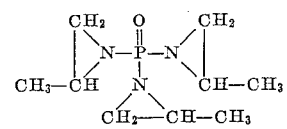

containing 0.25% of the condensate of ethylene oxide with octylphenol, with a fiber/bath ratio of 1:20, and then, after 20 minutes at 120° C., is washed with water and dried.

Using each of the dyes of Example 1, intense solid colors are obtained.

*Example 3*

A mixture is prepared at room temperature in a Henschel mixer from

| | Kg. |
|---|---|
| Polypropylene | 9.500 |
| Dichuoroethane/hexamethylene diamine condensate/alkylated with lauryl chloride (1/1/0.12) $[\eta_{sp}]=0.9$ | 0.500 |

The characteristics of the polypropylene are as follows:

$[\eta]$ _____ 1.58
Ash content, percent _____ 0.015
Residue after heptane extraction, percent _____ 95.6

The mixture is granulated and then extruded under the following conditions:

Screw temperature, ° C. _____ 205
Spinning head temperature, ° C. _____ 240
Spinneret temperature, ° C. _____ 245
Spinnert type, mm. _____ 60/0.8×16
Max. pressure, kg./cm.² _____ 57
Winding speed, m./minute _____ 380

The fiber is stretched in a steam-heated device at 130° C. with a stretching ratio of 1 to 5.3.

It is then subjected to a dimensional stabilization treatment, under conditions of free shrinking, at 105° C. for 60 minutes.

The characteristics of the stretched, stabilized fiber are as follows:

Tenacity, g./den. _____ 5.01
Elongation, percent _____ 25.0

The fiber is then crimped and cut into a staple with a length of 9 cm.

The fiber obtained is immersed for 30 minutes at 25° C. in a 5% aqqueous dispersion of tris [-1(2-methyl) aziridinyl] phosphoxide

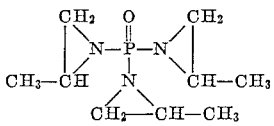

containing 0.25% of ethylene oxide/octylphenol condensate, with a fiber/bath ratio 1:40, and, after 20 minutes at 120° C., is washed with water and dried.

Using each of the dyes of Example 1, intense solid colors are obtained.

Variations can of course be made without departing from the spirit of the invention.

Having thus described our invention, what we desire to secure and claim by Letters Patent is:

1. In a method of preparing dyeable textile fibers by molten mass extrusion of a mixture of a polyolefin consisting essentially of isotactic macromolecules and a basic resinous nitrogen compound selected from the group consisting of polyalkylene imines, polyvinylpyridines, and polycondensates of epichlorohydrin with aliphatic amines, the improvement comprising contacting said fibers at a temperature of from about room temperature to 150° C. with a solution of a phosphorus compound of the formula

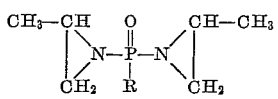

wherein R is selected from the group consisting of alkyl, aryl, and imino radicals, to thereby improve the dyeability and the color fastness of said fibers.

2. The method of claim 1 wherein said polyolefin is polypropylene consisting essentially of isotactic macromolecules.

3. The method of claim 1 wherein said basic nitrogen compound is the polycondensation product of a primary aliphatic amine with epichlorohydrin and piperazine.

4. The method of claim 1 wherein said basic nitrogen compound is a crystalline polymer of vinylpyridine prepared with stereospecific catalysts.

5. The method of claim 4 wherein said polymer of vinyl pyridine is poly-2-vinylpyridine.

6. The method of claim 4 wherein said polymer of vinyl pyridine is poly-4-vinylpyridine.

7. The method of claim 4 wherein said polymer of vinyl pyridine is poly-2-methyl 5-vinylpyridine.

8. The method of claim 1 wherein said basic nitrogen compound is a polyimine obtained by condensation of a dihaloalkane with an alkylene diamine.

9. The method of claim 1 wherein said phosphorus compound is tris[-1(2-methyl)aziridinyl]phosphoxide.

10. The method of claim 1 wherein said phosphorus compound is phenyl bis[1(2 - methyl)aziridinyl]phosphoxide.

11. The method of claim 1 wherein said treatment is carried out at a temperature of from about room temperature to 80° C., the concentration of said phosphorus compound in the solvent therefor varying from 0.1 to 25% by weight of said solution for a time of from about 2–3 seconds to three hours.

12. The method of claim 1 wherein said treatment is carried out at a temperature of from about room temperature to 80° C., the concentration of said phosphorus compound in the solvent therefor varying from 1 to 10% by weight of said solution, for a time of from about 2–3 seconds to three hours.

13. The method of claim 1 wherein there is added to said mixture from about 0.1 to 5%, calculated on the total mixture, of a solid dispersing agent for said nitrogen compound in the molten mixture, said dispersing agent being selected from the group consisting of cetyl alcohol, stearyl alcohol, stearic acid, terephthalic acid, benzoin, furoin, vinyl stearate, mono-, di- and tri-stearic esters of glycerol, monoethanolamine stearate, N-diethanol lauramide, $C_6$–$C_{30}$ aliphatic amines, condensates of ethylene oxide with alcohols, condensates of ethylene oxide with amines, condensates of ethylene oxide with phenols, polystearamide, polyacrylic acid, polystyrene, styrene copolymers, and terpene polymers.

14. Textile fibers obtained by the method of claim 1.

References Cited by the Examiner

UNITED STATES PATENTS 3,098,697   1/1963   Cappucio et al.

FOREIGN PATENTS 877,865   9/1961   Great Britain.

OTHER REFERENCES

Chemical Abstracts, vol. 53, 734b and 12694d, 1959, and vol. 52, 1958, 16754g.

NORMAN G. TORCHIN, *Primary Examiner.*

DONALD LEVY, *Examiner.*